April 12, 1932.  W. PARKER  1,853,877
WIRE WORKING APPARATUS
Filed Sept. 6, 1930
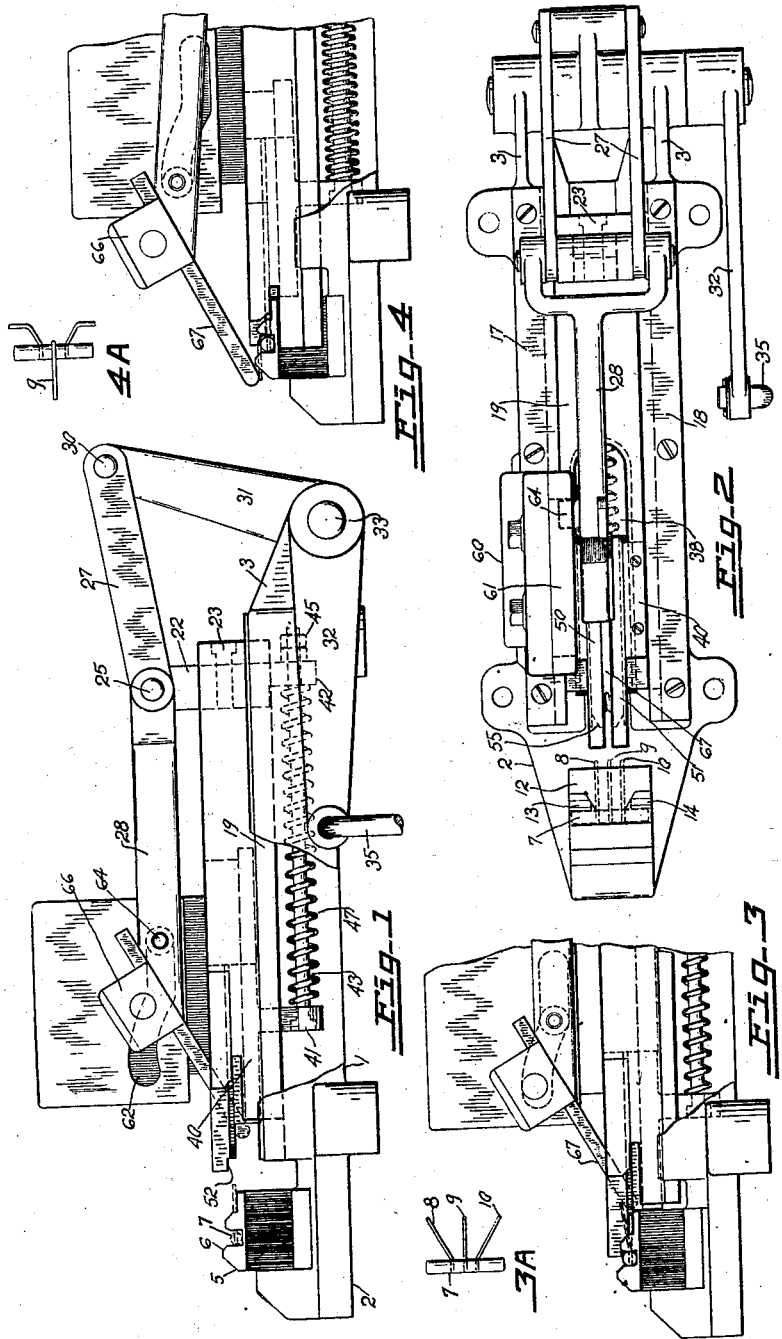
INVENTOR
WILLIAM PARKER
BY Le Roi J Williams
ATTORNEY Patented Apr. 12, 1932

1,853,877

UNITED STATES PATENT OFFICE

WILLIAM PARKER, OF OAK PARK, ILLINOIS, ASSIGNOR TO GRIGSBY-GRUNOW COMPANY, OF CHICAGO, ILLINOIS, A CORPORATION OF ILLINOIS

WIRE WORKING APPARATUS

Application filed September 6, 1930. Serial No. 480,043.

This invention relates to wire working apparatus, and particularly to apparatus for shaping the wires of beads used in vacuum tubes.

In order to furnish adequate support for the various electrodes in the vacuum tube, it is customary to employ a bead consisting of a short length of glass, in which are sealed a plurality of pieces of wire. Each piece, as a rule, must be shaped accurately so that the various welding operations may be carried out.

An object of this invention is to devise a machine which will shape such beads quickly and uniformly. A further object is to make a machine of the above character which is simple and easy to operate.

Referring to the drawings:

Figure 1 is a side view of the apparatus;
Figure 2 is a top view;
Figures 3 and 4 are details of the front end of the apparatus in two different positions; and
Figures 3A and 4A show beads with the wires bent in the manner corresponding to the position of the apparatus in Figures 3 and 4, respectively.

The machine comprises a base 1 having a forwardly projecting portion 2, and a rearwardly projecting portion 3. The forwardly projecting portion 2 is adapted to support an anvil 5 having a transversely disposed vertical channel 6, in which may be disposed a glass bead 7, as shown in Figure 2. Wires 8, 9 and 10 of the bead extend horizontally toward the rear of the machine. Anvil 5 has an inwardly disposed portion 12, so shaped that there are two upstanding portions 13 and 14 abutting channel 6 and on opposite sides of the anvil. It will be noted that portions 13 and 14 have suitably shaped sides so that outer wires 8 and 10 may be bent against them to the desired shape as shown in Figure 4A.

As shown in Figure 2, base 1 has provided along its opposite sides a pair of guides 17 and 18, between which a frame 19 is adapted to travel back and forth. Frame 19 is actuated by a vertical piece 22 secured thereto by bolt 23. Disposed at the upper end of member 22 is a pin 25, around which are pivotally mounted levers 27 and 28. Levers 27 are connected through pin 30 to arm 31 of the bell-crank lever 32, pivoted at 33 to portion 3 of the frame. A link 35 engages the free end of bell-crank lever 32 and connects it to a foot-treadle (not shown) for operating the machine.

Movable member 19 has a longitudinal slot 38 therein, along the edges of which is adapted to slide a member 40. Members 40 and 22 have depending portions 41 and 42 disposed below the plane of member 19. A pin 43 is slidingly disposed within members 41 and 42 to suitable apertures therein, and is maintained in position by nuts 45. A coil spring 47 is disposed around pin 43 between portions 41 and 42, and tends to maintain sliding members 40 and 22 separated, as shown in Figure 1.

Member 40 carries a pair of longitudinally disposed rails 50 and 51, spaced a slight distance apart. As shown in Figures 1 and 2, the forward bottom surfaces of rails 50 and 51 are cut away, forming a space 52 and angularly disposed sides 55. Rails 50 and 51 are suitably disposed with respect to anvil 5, so that the sloping sides 55 engage wires 8 and 10 of the bead and bend them outwardly, as shown in Figure 4A, while permitting central wire 9 to be free in the space between the rails.

Supported from one side of frame 1 is a vertical plate 60 carrying a bearing plate 61 on its inner side provided with a cam slot 62. Lever 28 is provided with a cam follower 64 adapted to ride in slot 62 and guide the movement of lever 28 in a vertical plane. The free end of lever 28 carries a clamping block 66, in which is clamped a rod 67, so positioned as to ride in the space between rails 50 and 51 with its lower free end just below the level of wires 8, 9 and 10 of the bead prior to deformation.

In order to shape a bead, the bead is disposed in the anvil as shown in Figure 2 and then the mechanism operated through link 35. A downward pull on link 35 rotates bell-crank lever 32 on its pin 33 and brings arm 31 forward. Through lever 27, vertical member 22, and hence slidable member 19, are moved forwardly toward the anvil. At the same time member 28 is moved forwardly, carrying rod 67 therewith between rails 50 and 51. The advancing of member 19 along its guides results in member 40 and rails 50 and 51 advancing forwardly through the spring connection between portions 41 and 42. As rails 50 and 51 advance, the forward face slides over wires 8, 9 and 10, bringing sloping sides 55 to bear against outer wires 8 and 10. The continued advance of rails 50 and 51 results in spreading the outer wires in accordance with the shape of the lower surface of the rails, so that the outer wires are bent as shown in Figure 4A. When rails 50 and 51 have advanced sufficiently to bend wires 8 and 10, as shown, further advance for them is impossible because of the engagement of the ends of the rails with portions 13 and 14 of anvil 5 and results in compression of spring 47. In the meantime vertical member 22, which has been traveling forward, forces member 28 onwardly and carries rod 67 to central wire 9.

It will be noted that slot 62 does not begin to raise lever 28 and its rod 67 for the first part of the travel. In the position shown in Figure 3, rod 67 has its front end just below central wire 9. The continued advance of this rod thus causes wire 9 to be bent upwardly. Rod 67 follows this upward travel of the wire by virtue of the rise in cam slot 62. As shown in Figure 2, the tip of rod 67 is slit so that wire 9 may rise therein and have no tendency to slip sideways. In this way rod 67 may follow wire 9 through the entire bending operation to the position shown in Figure 4, where wire 9 has been turned completely over. Release of link 35 permits the spring 47 to separate members 40 and 19 so that the apparatus assumes the position shown in Figure 1.

It is evident that as many rails may be provided as desired, while the bending surface of the anvils and rails may be shaped to secure any desired shape of bead wire. Obviously, more than one wire may be bent back on itself, if desired.

I claim:

1. A bead forming machine comprising a frame, an anvil disposed thereon and adapted to support a bead prior to shaping, a plurality of slidable members, means for causing said members to advance on the wires of said bead to shape them, and means for permitting at least one of said shaping members to travel after the remaining members have completed their travel.

2. A bead forming machine comprising a base, an anvil supported thereon and adapted to support a bead during its shaping operation, dies for shaping said wires, means for advancing certain of said dies toward said bead to shape said wires, and means for advancing another die so that said die is underneath the wire and follows it through a bending operation.

3. A bead forming machine comprising a base, an anvil supported thereon and adapted to support a bead during a shaping operation, a pair of dies, means for advancing said dies toward said bead for shaping certain of the wires, an additional die disposed between said other dies, and means for advancing said additional die after said other dies have completed their travel.

4. A bead forming machine comprising a base, an anvil disposed thereon adapted to support a bead during the shaping operation, a pair of dies adapted to travel toward said bead for shaping the wires and adapted to remain in a single plane during its travel, an additional die, means for moving said additional die toward said bead, said additional die adapted to travel in the same plane as the pair of dies for a portion of its stroke, and to travel in a different plane for the remainder of the stroke.

5. A bead forming machine comprising a frame, an anvil supported thereby and adapted to support a bead during the shaping operation, guides in said frame, a plurality of dies slidable in said guides for shaping the bead wires, a cam block supported on said frame, and means for moving at least one of said dies in accordance with the cam surface while advancing along the guides.

In testimony whereof he affixes his signature.

WILLIAM PARKER.